United States Patent
Lee et al.

(10) Patent No.: US 8,058,796 B2
(45) Date of Patent: Nov. 15, 2011

(54) ORGANIC LIGHT EMITTING DEVICE HAVING SURFACE-TREATED BOTTOM ELECTRODE

(75) Inventors: Jae Seung Lee, Daejeon (KR); Jung Bum Kim, Daejeon (KR); Young Chul Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 245 days.

(21) Appl. No.: 12/087,465

(22) PCT Filed: Jan. 8, 2007

(86) PCT No.: PCT/KR2007/000095
§ 371 (c)(1),
(2), (4) Date: Jul. 8, 2008

(87) PCT Pub. No.: WO2007/081120
PCT Pub. Date: Jul. 19, 2007

(65) Prior Publication Data
US 2009/0009064 A1 Jan. 8, 2009

(30) Foreign Application Priority Data
Jan. 9, 2006 (KR) .................. 10-2006-0002364

(51) Int. Cl.
*G09G 3/30* (2006.01)
*H01J 35/24* (2006.01)
*H01J 1/62* (2006.01)

(52) U.S. Cl. .......... 313/503; 313/506; 313/507; 445/24; 445/25

(58) Field of Classification Search .......... 313/500–512; 445/24–25; 427/66, 533–539, 553–559, 427/256, 258–265, 271–278, 372.2, 284–397
See application file for complete search history.

(56) References Cited

U.S. PATENT DOCUMENTS

| | | | |
|---|---|---|---|
| 5,534,103 A * | 7/1996 | Yano et al. | ................. 156/272.8 |
| 6,366,017 B1 | 4/2002 | Antoniadis et al. | |
| 6,720,198 B2 | 4/2004 | Yamagata et al. | |
| 2002/0142504 A1 | 10/2002 | Feldman et al. | |
| 2004/0012980 A1 * | 1/2004 | Sugiura et al. | ................. 362/560 |
| 2010/0044694 A1 | 2/2010 | Son et al. | |

FOREIGN PATENT DOCUMENTS

| | | |
|---|---|---|
| JP | 09-232075 | 9/1997 |
| JP | 2000-133466 | 5/2000 |
| KR | 1020010057125 A | 7/2001 |
| KR | 100316586 B1 | 11/2001 |
| KR | 1020020092643 A | 12/2002 |
| TW | 569353 | 1/2004 |
| TW | 2004/27372 | 12/2004 |

* cited by examiner

*Primary Examiner* — Anne Hines
*Assistant Examiner* — Tracie Green
(74) *Attorney, Agent, or Firm* — McKenna Long & Aldridge LLP

(57) ABSTRACT

Disclosed is a method of manufacturing an organic light emitting device, which comprises the steps of successively stacking a bottom electrode, an organic layer including an emission layer, and a top electrode, the method further comprising the step of: surface-treating the bottom electrode with ion beam etching before stacking the organic layer. By effectively removing impurities such as polymer materials or oxidation films, which are formed on the bottom electrode of the organic light emitting device, not only electron injection and hole injection in the organic light emitting device progress smoothly, but also an operation voltage is lowered and performance reliability can ensured because the surface roughness of the bottom electrode is maintained at the same level before and after ion milling.

16 Claims, 3 Drawing Sheets

ORGANIC LIGHT EMITTING DEVICE HAVING SURFACE-TREATED BOTTOM ELECTRODE

This application claims the benefit of International Application Number PCT/KR/2007/000095 filed on Jan. 8, 2007 and Korean Application No. 10-2006-0002364 filed on Jan. 9, 2006, both of which are hereby incorporated by reference as if fully set forth herein.

TECHNICAL FIELD

The present invention relates to a method of surface-treating a bottom electrode of an organic light emitting device.

BACKGROUND ART

Various flat panel displays such as a liquid crystal display (LCD), a field emission display (FED), a plasma display panel (PDP) and an electro luminescence (EL) display have recently emerged as candidate displays capable of replacing a conventional cathode ray tube.

Among devices used for these flat panel displays, an organic light emitting device is in the spotlight as a device suitable for a next-generation flat panel display because it has superior characteristics including a low driving voltage of 3 to 10V, a wide viewing angle, high-speed response, a high contrast ratio and so forth. This organic light emitting device is a device in which, if electric charges are injected into an organic emission layer formed between an electron injection electrode (negative electrode) and a hole injection electrode (positive electrode), electrons and holes meet each other to generate excitons, and light emission occurs when the excitons fall again to the ground state.

Such an organic light emitting device generally has a structure in which a cathode electrode (negative electrode) and an anode electrode (positive electrode) are disposed opposite to each other on a transparent substrate such as a glass substrate, and an organic emission layer is formed therebetween. An electron or hole transportation layer and an electron or hole injection layer may be additionally interposed between the electrodes and the emission layer. According to the prior art, a transparent electrical conductive electrode having a high work function is used as the positive electrode in order to satisfy the positive electrode's functions of supplying holes and transmitting emitted light to the outside, and such an electrode may be formed by sputtering an ITO (Indium-Tin Oxide) film, an IZO (Indium-Zinc Oxide) film or the like. The negative electrode functions to supply electrons, and a metal thin film having low work function may be formed as the negative electrode by means of a thermal evaporation process, etc.

A display using an organic light emitting device may be classified into a passive matrix (PM) type and an active matrix (AM) type according to a driving method thereof. In the passive matrix type, the organic light emitting device is placed in a portion where bus lines of positive and negative electrodes intersect each other, and is driven in a line-by-line scanning manner. In the active matrix type, ON/OFF adjustment is performed on a pixel-by-pixel basis by using at least one thin film transistor (TFT), and storage capacitance is used for storing information. Further, the active matrix type has advantages in that a process of forming a unit pixel is simpler than in the passive matrix type, and a high definition panel can be manufactured.

A method of manufacturing an organic light emitting device includes a process of forming a bottom electrode on a glass substrate. The bottom electrode is formed directly on the glass substrate in the case of the passive matrix (PM) type, and is formed after fabricating a thin film transistor on the glass substrate in the case of the active matrix (AM) type.

The organic light emitting device may also be classified into a bottom emission type and a top emission type according to a light emission direction thereof. The bottom emission type has a structure in which light is emitted downward, and the top emission type has a structure in which light is emitted upward. In the bottom emission structure, when a TFT is formed below a substrate formed with an emission layer, a small light emitting area cannot be avoided owing to the TFT. On this account, an organic light emitting device having the top emission structure is better in light emission efficiency than an organic light emitting device having the bottom emission structure, and thus is actually more suitable for a display.

However, in view of manufacturing processes, there is a problem in that, when an ITO layer, that is, an anode, is formed by sputtering after an organic material layer is formed, the organic material is damaged by the sputtering, which results in deterioration in the performance of an organic light emitting device. Therefore, in a common manufacturing method of an active matrix type organic light emitting device, it is generally practiced that the ITO layer, that is, an anode, is formed as a bottom electrode. Nevertheless, some investigators have created an organic material capable of enduring the damage caused by sputtering, and have succeeded in developing a so-called inverse structure in which a cathode is formed as a bottom electrode and an anode formed by sputtering is used as a top electrode, so that it has become possible to easily manufacture a top emission structure having good light emission efficiency.

DISCLOSURE OF THE INVENTION

A bottom electrode of an organic light emitting device is patterned by means of a photolithography process during which various oxides, organic materials, or polymer materials, including residues of a photoresist (PR) and a PR stripper used in that process, may remain on the surface of the bottom electrode and act as impurities.

Further, during the photolithography process, an oxidation film may be formed on the surface of aluminum metal which is a typical material used as the bottom electrode when the bottom electrode becomes a negative electrode as in the inverse structure.

Such impurities, that is, organic materials, polymer residues or oxidation films, inhibit electrons or holes from being injected into an organic material layer to be subsequently formed, and thus may cause significant deterioration in the performance of an organic light emitting device.

Accordingly, the present inventors have conducted studies in order to solve the above-mentioned problems occurring in the prior art, and have found out that, by effectively removing impurities such as polymer materials or oxidation films, which are formed on a bottom electrode of an organic light emitting device, by means of an ion milling method, etc., not only electron injection and hole injection in the organic light emitting device progress smoothly, but also an operation voltage is lowered and performance reliability can ensured because the surface of the bottom electrode is maintained flat.

Therefore, it is an object of the present invention to provide a method of manufacturing an organic light emitting device, characterized in that impurities are removed by surface-treating a bottom electrode with ion beam etching, and an organic light emitting device manufactured by the same.

To accomplish this object, according to one aspect of the present invention, there is provided a method of manufacturing an organic light emitting device, which includes the steps of successively stacking a bottom electrode, an organic layer including an emission layer, and a top electrode, the method further comprising the step of: surface-treating the bottom electrode with ion beam etching before stacking the organic layer.

In accordance another aspect of the present invention, there is provided an organic light emitting device including: a bottom electrode; an organic layer including an emission layer; and a top electrode, wherein the organic light emitting device is manufactured by successively stacking the bottom electrode, the organic layer including the emission layer, and the top electrode, and wherein the surface of bottom electrode adjacent to the organic layer is treated with ion beam etching.

In accordance with yet another aspect of the present invention, there is provided a bottom electrode for an organic light emitting device, on or above which an organic layer including an emission layer is to be directly or indirectly stacked, and which is surface-treated with ion beam etching.

Hereinafter, the present invention will be described in detail.

In the specification, a bottom electrode refers to an electrode which is formed first from among positive and negative electrodes in the sequence of processes, and a top electrode refers to an electrode which is formed opposite to the bottom electrode on an organic layer after the organic layer is stacked on the bottom electrode.

In the specification, impurities on the surface of an electrode refers to process impurities in the form of films or particles, which are unnecessary or may impede device characteristics, and include organic materials and/or polymers and/or natural oxidation films (oxidation films on metal electrodes) remaining on the surface of an electrode.

Manufacturing processes of an organic light emitting device begin with the step of forming a bottom electrode. Of course, a thin film transistor is formed first in the case of an active matrix type, and the bottom electrode may become a cathode electrode (negative electrode) or an anode electrode (positive electrode) according to whether it has a top emission structure or a bottom emission structure. The bottom emission structure is the case where the bottom electrode is an anode electrode, and a transparent electrode of ITO, IZO or the like is used as the bottom electrode, and the top emission structure is the case where the bottom electrode is a cathode electrode, and a metal electrode of, for example, Al, Ca, Mg, Ag, etc. is used as the bottom electrode. Some investigators inversely construct bottom and top electrodes as anode and cathode electrodes, respectively, in the top emission structure, and simultaneously reduce the film thickness of Al, Ca, Mg, Ag, etc. in the cathode electrode such that the cathode electrode has optical transparency, or use metal of Al, Ca, Mg, Ag, Au, etc. as the anode electrode. In any event, the present invention is not limited the above-mentioned materials of the top and bottom electrodes, and may be applied to any type of organic light. emitting device.

In all the cases mentioned above, an electrode is generally patterned by a photolithography process, and the photolithography process includes photoresist coating (PR coating), soft bake, mask alignment, exposure, development, hard bake, etching and PR stripping.

In such a photolithography process, a PR solution consists of a solvent, a polymer, a photoactive agent and so forth. Of these constituents of the PR solution, the polymer is used as a binder and determines the mechanical properties (thickness, fluidity, the degree of adhesion, flow by heat, etc.) of a film. Thus, organic material or polymer material residues which are not completely washed out in the course of the development may remain in non-patterned regions or organic material or polymer material residues which are not completely stripped in the course the PR stripping may remain in patterned regions. Such remaining residues act as impurities, and may exist in the form of films or agglomerated particles.

Further, since a metal electrode passes through DI water washing and baking (heat treatment) many times, a natural oxidation film may be formed on the surface of the metal electrode.

If an organic light emitting device is manufactured in such a manner that such organic material or polymer material residues or oxidation films are left intact and an organic layer including an emission layer is formed thereon, an operation voltage may increase or the overall performance may deteriorate because electron injection from a negative electrode or hole injection from a positive electrode is inhibited.

The present invention provides a method of manufacturing an organic light emitting device, characterized in that, after a bottom electrode is formed and before an organic layer is stacked thereon, impurities such as polymers, oxidation films, etc. are removed by surface-treating the bottom electrode with ion beam etching in which ions accelerated from an external source collide against the surface of the bottom electrode. As an example of the ion beam etching treatment, ion milling may be used.

Ion milling or ion beam etching refers to a technology in which a gas such as Ar is ionized and the ionized gas is accelerated to a substrate surface by applying an electric field thereto, so that the substrate surface is dry-etched only by a physical impact action on the substrate via the momentums of the accelerated ions, and is widely used in semiconductor manufacturing processes and for manufacturing specimens of a TEM (Transmission Electron Microscope).

That is, when ions, accelerated by an electric filed, etc. and thus having very high momentums, collide against an electrode surface or impurities existing on the electrode surface, electrode constituent materials together with the impurities are etched and released from the electrode surface or only the impurities existing on the electrode surface are released and removed from the electrode surface. The released impurities or etched materials can be removed from the system by using vacuum and so on. According to a feature of ion milling or ion beam etching, the electrode surface has the same level of surface roughness before and after the removal of the etched impurities or materials, and thus the performance of subsequently manufactured organic light emitting device is not affected by the ion milling process in view of the surface roughness of the electrode.

In the case of plasma etching used in semiconductor dry etching processes, since both physical etching and chemical etching are involved in the etching process. Thus, when plasma etching is applied to bottom electrode treatment in an organic light emitting device, there is a problem in that the surface of the bottom electrode is roughened due to plasma damage, and residues of other gases used with Ar are formed. However, if the bottom electrode treatment is performed by means of ion milling according to the present invention, the electrode surface can be etched only by pure physical etching while chemical etching is excluded by using ions having no reactivity with the electrode, for example, argon ions ($Ar^+$), and the etched electrode surface can be maintained flat.

That is, when plasma etching or wet etching is used as a process of removing surface impurities in the course of manufacturing a bottom electrode, the surface of the already-manufactured bottom electrode is roughened and secondary impurities coming from components of a plasma gas or a wet etching solution remain on the electrode surface, which ultimately results in deterioration in the electron or hole injection characteristic and the lifetime shortening of the organic light emitting device. In contrast with this, in the present invention, the performance reliability and the lifetime of the organic light emitting device can be improved by removing surface impurities and providing a flat electrode surface through ion milling.

Further, since there is no etching selectivity when the electrode surface is etched by ion milling, the ending point of ion milling must be selected depending on process parameters such as a gas pressure, a milling time, an acceleration voltage and the like, and the electrode surface needs to be etched to very shallow depth in order not to cause damage to a TFT and so forth which are protected by a protective film such as a silicon nitride film, etc. In the present invention, etching depth may be preferably in a range of 5 Å to 200 Å.

A bottom electrode forming the subject matter of the present invention may be formed by stacking a electrical conductive material on a substrate or may be a substrate itself made of a electrical conductive material, and methods well known in the art, including sputtering, thermal evaporation, etc., may be used as the stacking method.

When an organic light emitting device is manufactured in the inverse structure, a bottom electrode may be a negative electrode.

In the case where a bottom electrode is a negative electrode, the negative electrode may be preferably made of low work function metal such as Al, Ca, Mg, Ag, Cr, Ti, Pd, Au, Mo, Ir or the like, or an alloy thereof. A negative electrode including such a metal material may be formed by methods well known in the art, preferably by thermal evaporation.

When a bottom electrode forming the subject matter of the present invention is a positive electrode, a transparent electrical conductive material such as ITO (Indium-Tin Oxide), IZO (Indium-Zinc Oxide), ZnO, $SnO_2$, etc. may be used as a positive electrode material, and metal such as Al, Ag, Ca, Mg, Au, Mo, Ir, Cr, Ti, Pd or the like may also be used as a positive electrode material according to the characteristics of a hole injection layer to be subsequently formed. Such a positive electrode material may be formed by methods well known in the art, preferably by sputtering or thermal evaporation.

In the present invention, impurities existing on a bottom electrode surface of an organic light emitting device, including polymers, oxidation films, etc., may be removed by impacting accelerated ions against the electrode surface and thus releasing the impurities from the electrode surface. It is preferred that such a removal is done by a pure physical impact action, and the ions used in the removal of the impurities are those having no reactivity with the electrode surface.

More preferably, the above-mentioned ions may be argon ions ($Ar^+$), gallium ions ($Ga^+$) or argon/gallium mixture gas ions ($Ar^+$ and $Ga^+$).

A method of manufacturing an organic light emitting device as described herein includes the step of successively stacking a bottom electrode, an organic layer including an emission layer, and a top electrode. Steps other than the above-mentioned step of treating the bottom electrode may be carried out by methods well known in the art.

An organic light emitting device according to the present invention may include a type in which a bottom electrode, an organic layer including an emission layer, and a top electrode are stacked in sequence, wherein the bottom electrode directly or indirectly adjoins the organic layer by stacking the organic layer directly thereon or by stacking an LiF layer and then the organic layer, and electrons or holes supplied from the bottom electrode are injected into the organic layer. In so-constructed organic light emitting device, electron or hole injection can progress smoothly and thus the performance of the organic light emitting device can be improved by removing injection-inhibiting impurities through ion beam etching treatment.

An organic light emitting device as described herein may be used for information display or a backlight and may be preferably used in a display apparatus. The display apparatus including an organic light emitting device may be any one of an active matrix type and a passive matrix type and may be provided with a bottom electrode which is patterned according to each type.

BRIEF DESCRIPTION OF THE DRAWINGS

The foregoing and other objects, features and advantages of the present invention will become more apparent from the following detailed description when taken in conjunction with the accompanying drawings in which.

MODE FOR CARRYING OUT THE INVENTION

Reference will now be made in detail to preferred embodiments of the present invention. However, the present invention is not limited to the following embodiments.

EXAMPLES 1

Aluminum was deposited on a glass substrate by sputtering, and then an aluminum bottom electrode was patterned using photolithography. The surface of the patterned aluminum bottom electrode was etched by means of Ar ion milling to remove impurities from the surface. The conditions of ion milling were an Ar-flow rate of 25 sccm, a chamber vacuum degree of $5\times10^{-5}$ Torr, an acceleration voltage of 500 eV and a milling time of 20 seconds. After the ion milling process, an organic material layer was thermally evaporated on the aluminum electrode, from which the impurities had been removed, without exposing the glass substrate to the atmosphere, by which an organic light emitting device was manufactured.

The manufactured organic light emitting device had a structure of ion-milled aluminum/LiF/electron transportation layer (ETL)/emission layer (EML)/hole transportation layer (HTL)/hole injection layer (HIL)/transparent electrical conductive anode electrode (IZO) (viewed from bottom to top).

Figure 1:
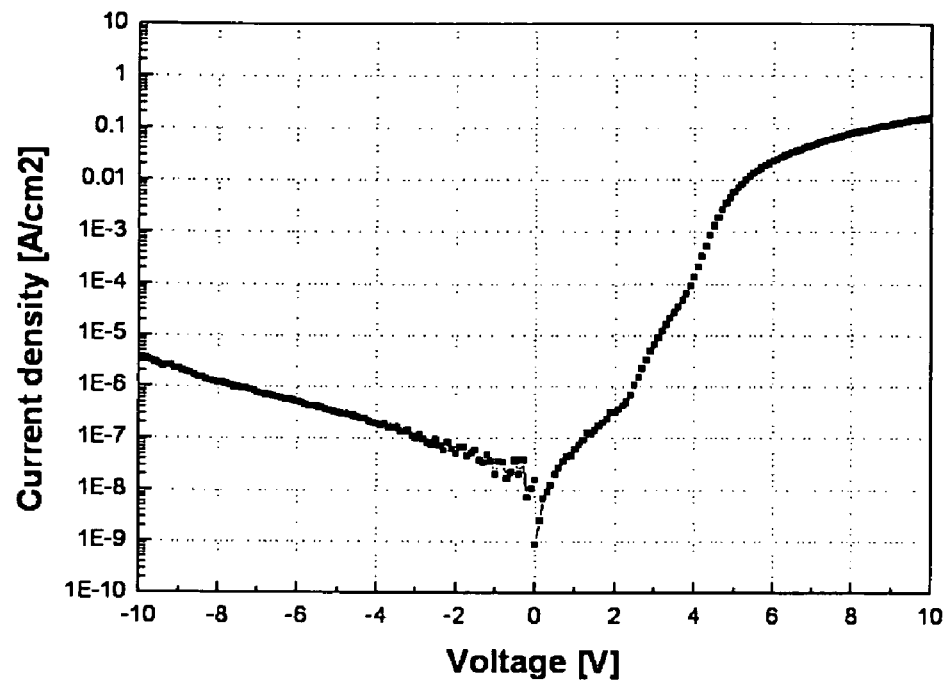
FIG. 1 is a current-voltage characteristic graph of an organic light emitting device manufactured according to a method of Example 1.

As seen from FIG. 1, a driving voltage showed values of 5.4V and 7.2V at current densities of 10 $mA/cm^2$ and 50 $mA/cm^2$, respectively, and an output showed values of 18.7 Cd/A and 17.0 Cd/A at current densities of 10 $mA/cm^2$ and 50 $mA/cm^2$, respectively.

Further, in order to examine an electron injection characteristic in the bottom electrode, a specimen for ascertaining the electron injection characteristic was fabricated, which had a structure of ion-milled aluminum/LiF/electron transportation layer (ETL)/LiF/aluminum (viewed from bottom to top). The conditions of ion milling were the same as the above-mentioned conditions.

Figure 2:
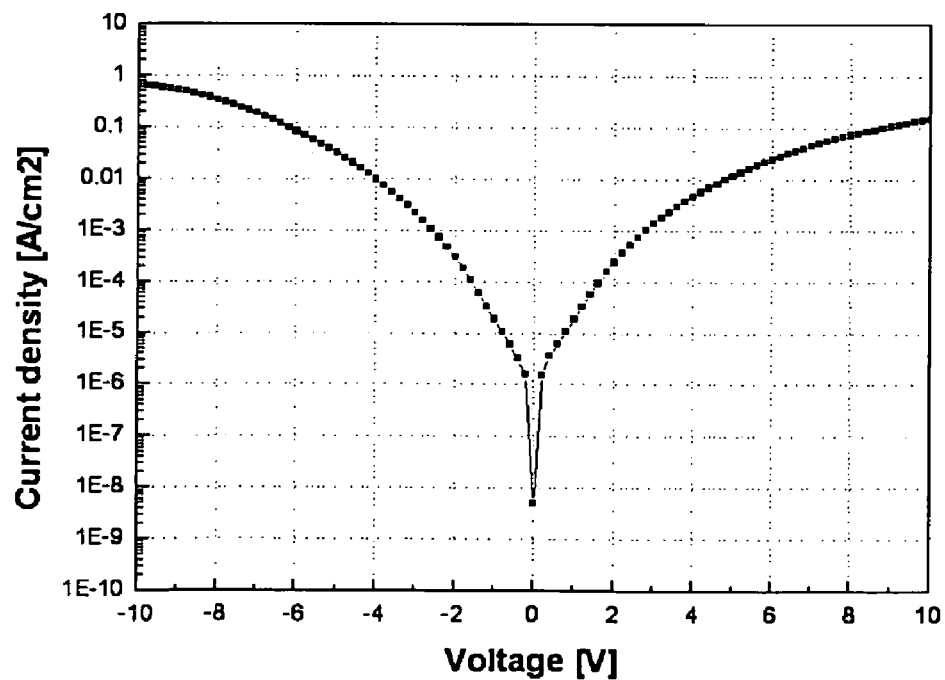
FIG. 2 is a current-voltage characteristic graph of a specimen for ascertaining an electron injection characteristic in Example 1.

FIG. 2 illustrates a result obtained by measuring an I-V characteristic while applying a voltage to the top Al electrode and grounding the bottom electrode, and values in the positive (+) region of the X-axis represent the electron injection characteristic in the bottom electrode. Whether or not it is easy to inject electrons can be find out from a current density value at a specific applied voltage, and electron injection in the bottom electrode has been proven to be easy, which indicates that impurities were removed from the aluminum bottom electrode surface.

REFERENCE EXAMPLE 1

An organic light emitting device was manufactured in the same manner as in Example 1, except that the electrode structure of an aluminum bottom electrode was patterned directly on the glass substrate by vacuum deposition using a shadow mask without passing through a photoresist process, and ion milling was not carried out. Thus, it was possible to exclude surface impurities and oxidation films which might occur during the patterning process by means of photolithography.

Figure 3:
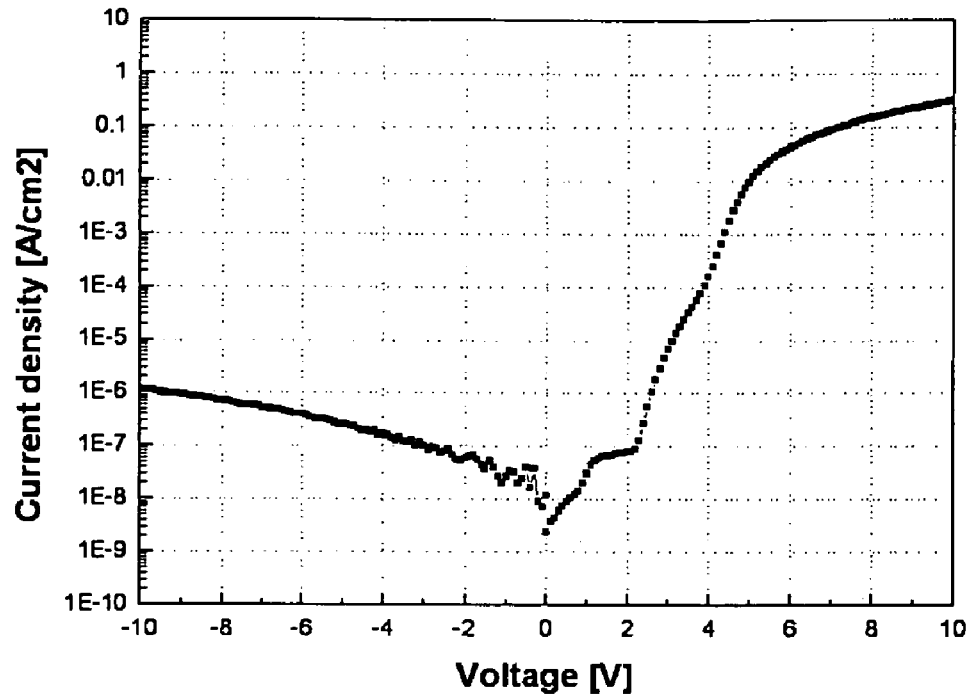
FIG. 3 is a current-voltage characteristic graph of an organic light emitting device manufactured according to a method of Reference Example 1.

As seen from FIG. 3, a driving voltage showed values of 5.1V and 6.2V at current densities of 10 mA/cm$^2$ and 50 mA/cm$^2$, respectively, and an output showed values of 20.3 Cd/A and 17.4 Cd/A at current densities of 10 mA/cm$^2$ and 50 mA/cm$^2$, respectively.

Further, in order to examine an electron injection characteristic in the bottom electrode, a specimen for ascertaining the electron injection characteristic was fabricated, which had a structure of aluminum formed by shadow mask/LiF/electron transportation layer (ETL)/LiF/aluminum (viewed from bottom to top).

Figure 4:
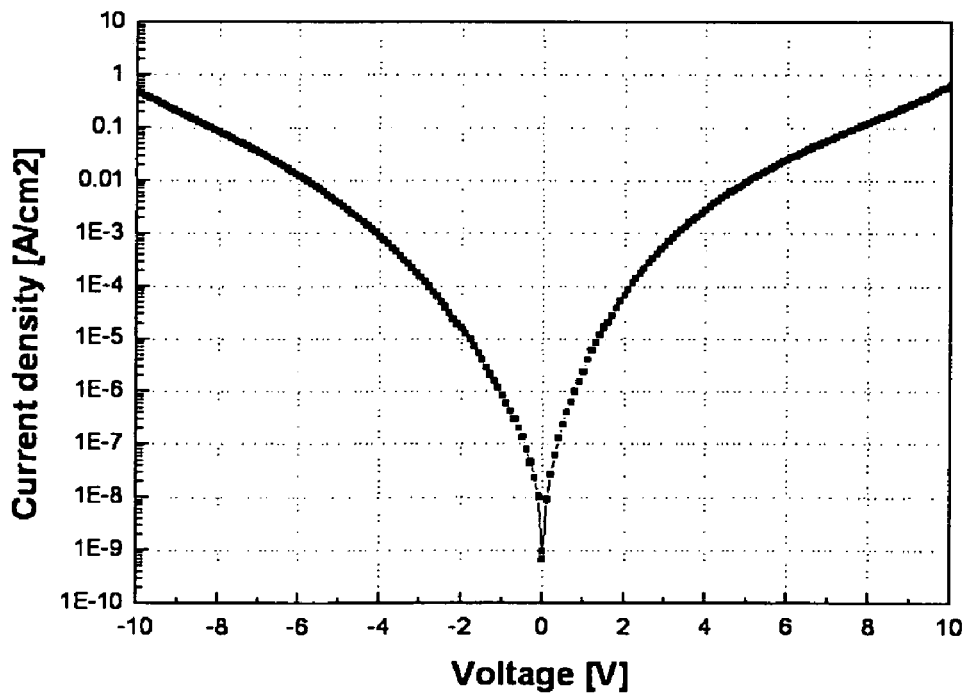
FIG. 4 is a current-voltage characteristic graph of a specimen for ascertaining an electron injection characteristic in Reference Example 1.

FIG. 4 also illustrates a result obtained by measuring an I-V characteristic while applying a voltage to the top Al electrode and grounding the bottom electrode, and values in the positive (+) region of the X-axis represent the electron injection characteristic in the bottom electrode. As illustrated in FIG. 4, the result of the organic light emitting device according to Reference Example 1 showed that the electron injection characteristic in the bottom electrode was excellent in the same manner as that in the top electrode.

COMPARATIVE EXAMPLE 1

An organic light emitting device was manufactured in the same manner as in Example 1, except that a bottom electrode, not subjected to ion milling, was used after aluminum was deposited and its patterning was carried out by means of photolithography. Thus, it seems that surface impurities and oxidation films exist, which may occur during the patterning by means of photolithography, and this is true in view of a result as will be described.

The so-manufactured organic light emitting device did not operate well, and thus it was impossible to measure an I-V characteristic. It was also impossible to measure luminance because a fail occurred in a specimen the moment the specimen emitted light. A driving voltage showed a value of 12V at a current density of 10 mA/cm$^2$, but it was impossible to measure a driving voltage at a current density of 50 mA/cm$^2$ due to fail occurrence.

In order to examine an electron injection characteristic in the bottom electrode, a specimen for ascertaining the electron injection characteristic was fabricated, which had a structure of photolithography-patterned aluminum/LiF/electron transportation layer (ETL)/LiF/aluminum (viewed from bottom to top).

Figure 5:
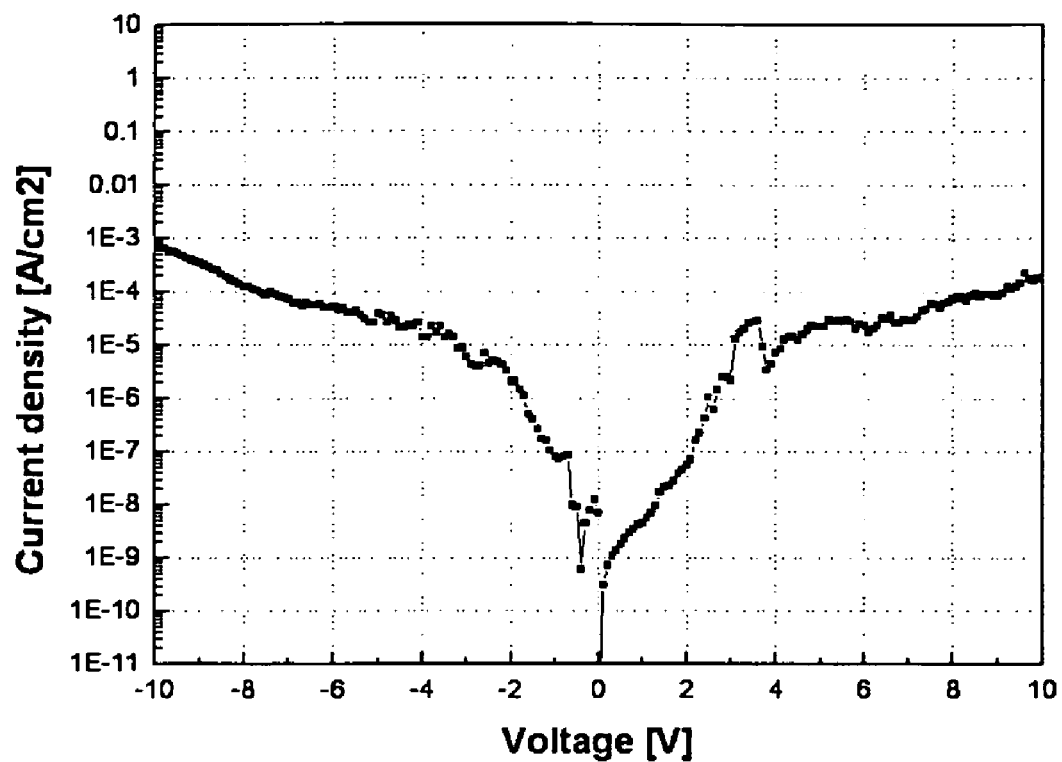
FIG. 5 is a current-voltage characteristic graph of a specimen for ascertaining an electron injection characteristic in Comparative Example 1.

FIG. 5 also illustrates a result obtained by measuring an I-V characteristic while applying a voltage to the top Al electrode and grounding the bottom electrode, and values in the positive (+) region of the X-axis represent the electron injection characteristic in the bottom electrode. As illustrated in FIG. 5, the electron injection characteristic in the bottom electrode has been proved to be not easy, which indicates that impurities exist on the surface of the aluminum bottom electrode.

INDUSTRIAL APPLICABILITY

According to the present invention as described above, impurities such as polymer materials or oxidation films, which are formed on a bottom electrode of an organic light emitting device, are effectively removed by means of ion milling. Therefore, not only electron injection and hole injection in the organic light emitting device progress smoothly, but also an operation voltage is lowered and performance reliability can ensured because the surface roughness of the bottom electrode is maintained at the same level before and after ion milling.

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A method of manufacturing an organic light emitting device, which comprises the steps of successively stacking a bottom electrode, an organic layer including an emission layer, and a top electrode, the method further comprising the step of:
    removing impurities by surface-treating the bottom electrode with ion beam etching before stacking the organic layer, wherein the ion beam etching is carried out using ions having no reactivity with a surface of the bottom electrode such that the electrode surface can be maintained as substantially flat surface having the substantially same level of surface roughness before and after the ion beam etching.

2. The method according to claim 1, wherein a surface of the bottom electrode is etched to a depth of 5 to 200 Å by surface-treating the bottom electrode with the ion beam etching.

3. The method according to claim 1, wherein the impurities include oxidation films of metals.

4. The method according to claim 1, wherein the bottom electrode is formed as a negative electrode (cathode).

5. The method according to claim 1, wherein the bottom electrode is made of any one selected from the group of metal elements including Al, Ca, Mg, Ag, Cr, Ti, Pd, Au, Mo and Ir, or an alloy consisting of at least two kinds of the metal elements.

6. The method according to claim 1, wherein the bottom electrode is made of one transparent electrical conductive oxide selected from the group consisting of ITO (Indium-Tin Oxide), IZO (Indium-Zinc Oxide), ZnO and SnO$_2$.

7. The method according to claim 1, wherein the ion beam etching, carried out using ions having no reactivity with a surface of the bottom electrode, provides only an impact action on the surface of the bottom electrode and impurities existing thereon.

8. The method according to claim 1, wherein the ion having no reactivity with the surface of the bottom electrode includes an argon ion ($Ar^+$), a gallium ion ($Ga^+$) or an argon/gallium mixture gas ion ($Ar^+$ and $Ga^+$).

9. An organic light emitting device comprising:
an ion beam etching treated bottom electrode;
an organic layer including an emission layer; and
a top electrode,
wherein the organic light emitting device is manufactured by successively stacking the bottom electrode, the organic layer including the emission layer, and the top electrode,
wherein the surface of bottom electrode adjacent to the organic layer is treated with ion beam etching using ions having no reactivity with the surface of the bottom electrode before stacking the organic layer to remove impurities, and
wherein the surface of the ion beam etching treated bottom electrode has a substantially flat surface having the substantially same level of surface roughness before and after the ion beam etching.

10. The organic light emitting device according to claim 9, wherein the bottom electrode is formed by stacking an electrical conductive material on a substrate or may be a substrate itself made of an electrical conductive material.

11. The organic light emitting device according to claim 9, wherein the organic light emitting device is used in a display apparatus, and the bottom electrode is patterned in such a manner as to allow the display apparatus to be driven according to an active matrix type or a passive matrix type.

12. An ion beam etching treated bottom electrode for an organic light emitting device, on or above which an organic layer including an emission layer is to be directly or indirectly stacked, and which is surface-treated with ion beam etching using ions having no reactivity with the surface of the bottom electrode, wherein the surface of the ion beam etching treated bottom electrode has a substantially flat surface having the substantially same level of surface roughness before and after the ion beam etching.

13. The organic light emitting device according to claim 9, wherein a surface of the bottom electrode is etched to a depth of 5 to 200 Å by surface-treating the bottom electrode with the ion beam etching.

14. The organic light emitting device according to claim 9, wherein the impurities include oxidation films of metals.

15. The method according to claim 1, wherein the bottom electrode is wholly or partially patterned by a photolithography process when the bottom electrode is formed, and impurities coming from the photolithography process are removed by surface-treating the bottom electrode with the ion beam etching.

16. The organic light emitting device according to claim 9, wherein the bottom electrode is wholly or partially patterned by a photolithography process when the bottom electrode is formed, and impurities coming from the photolithography process are removed by surface-treating the bottom electrode with the ion beam etching.

* * * * *